US007011691B2

(12) United States Patent
Abe

(10) Patent No.: US 7,011,691 B2
(45) Date of Patent: Mar. 14, 2006

(54) OXIDE SINTERED BODY

(75) Inventor: Yoshiyuki Abe, Chiba-ken (JP)

(73) Assignee: Sumitomo Metal Mining Co. Ltd., Tokyo (JP)

( * ) Notice: Subject to any disclaimer, the term of this patent is extended or adjusted under 35 U.S.C. 154(b) by 0 days.

(21) Appl. No.: 10/441,980

(22) Filed: May 20, 2003

(65) Prior Publication Data

US 2004/0040414 A1 Mar. 4, 2004

(30) Foreign Application Priority Data

Aug. 30, 2002 (JP) ............................. 2002-255425

(51) Int. Cl.
*C22C 29/12* (2006.01)
(52) U.S. Cl. ........................................ 75/232; 501/134
(58) Field of Classification Search ................ 75/232; 423/624; 501/134
See application file for complete search history.

(56) References Cited

U.S. PATENT DOCUMENTS

| 4,671,777 | A | * | 6/1987 | van Esdonk et al. | .......... 445/51 |
| 5,225,273 | A | * | 7/1993 | Mikoshiba et al. | .......... 428/323 |
| 6,617,056 | B1 | * | 9/2003 | Hara et al. | .................. 428/697 |

FOREIGN PATENT DOCUMENTS

| JP | 56090250 A | * | 12/1979 |
| JP | 6056503 A | * | 8/1992 |
| JP | 2002-200534 | | 7/2002 |
| JP | 2002-211678 | | 7/2002 |
| JP | 256424 | * | 9/2002 |
| JP | 275623 A | * | 9/2002 |
| JP | 2002-330058 | | 11/2002 |

OTHER PUBLICATIONS

"Transparent Conductive Film Technology" Ohm Co., 1999; p. 82.
U. S. Appl. No. 10/445,708, filed May 27, 2003, Abe.

* cited by examiner

*Primary Examiner*—Ngoclan T. Mai
(74) *Attorney, Agent, or Firm*—Katten Muchin Rosenman LLP

(57) ABSTRACT

An oxide sintered body is composed mainly of indium and containing tungsten, has a resistivity of no more than 1 kΩcm. The tungsten content in terms of the W/In atomic ratio is preferably at least 0.001 and no more than 0.17. The oxide sintered body comprise mainly a bixbyite structure indium oxide crystal phase containing tungsten in a solid solution and/or an indium tungstate compound crystal phase, with no tungsten oxide crystal phase present, whereby an oxide sintered body for use as a sputtering target is provided for an oxide based transparent conductive film with low resistance and excellent transmission characteristics for the infrared light region.

12 Claims, No Drawings

OXIDE SINTERED BODY

TECHNICAL FIELD OF THE INVENTION

The present invention relates to an oxide sintered body for use as a sputtering target or an ion plating tablet when manufacturing a low resistance oxide based transparent conductive film used in solar cells and liquid crystal display elements and the like by a sputtering method or an ion plating method, and relates specifically to an oxide sintered body for use as a sputtering target and as an ion plating tablet used to form a transparent conductive film which has a high transmittance in the infrared region, and low resistance, for use in a solar cell.

PRIOR ART

Oxide based transparent conductive films have both high conductivity, and high transmittance of the visible light spectrum. Consequently, oxide based transparent conductive films are used not only as the electrodes in solar cells, liquid crystal display elements, and various other photodetectors, but due to their reflection and absorption characteristics for near infrared wavelengths, are also used as heat reflecting films for car window glass or building window glass, as a variety of antistatic coatings, and as transparent heating elements for defogging freezing display cases and the like.

Widely used varieties of oxide based transparent conductive films include tin oxide ($SnO_2$) films containing antimony or fluorine as a dopant, zinc oxide (ZnO) films containing aluminum or gallium as a dopant, and indium oxide ($In_2O_3$) films containing tin as a dopant. Indium oxide films which contain tin as a dopant, that is $In_2O_3$—Sn based films, are referred to as ITO (Indium Tin Oxide) films, and have been widely used because of the ease with which a low resistance oxide based transparent conductive film can be obtained.

Frequently used methods for manufacturing the oxide based transparent conductive films mentioned above include sputtering methods and vapor deposition methods, ion plating methods, and methods involving the application of a coating for forming a transparent conductive layer. In particular, sputtering methods and ion plating methods are effective when using a material with low vapor pressure, or when precise control of the film thickness is required, and are widely used industrially because of their extreme ease of operation.

In a sputtering method, generally a film is formed by causing a glow discharge to occur between a substrate acting as the anode, and a sputtering target of a raw material for forming an oxide based transparent conductive film acting as the cathode, under an argon gas pressure of no more than approximately 10 Pa, to generate argon plasma, and then causing the positive argon ions within the plasma to strike the cathode target, thereby ejecting particles of the target component, and causing these particles to be deposited on the substrate.

Sputtering methods are classified according to the method used to generate argon plasma, and those methods which use RF plasma are called RF sputtering methods, while those using direct current plasma are called DC sputtering methods. DC sputtering methods are more widely used industrially due to their faster deposition rates, cheaper power supplies and simpler deposition operation than RF sputtering methods. However, although a nonconductive sputtering target can be used with an RF sputtering method, with a DC sputtering method, a conductive sputtering target must be used.

Furthermore, the deposition rate of a sputtering method is closely related to the chemical bonds of the materials which constitute the sputtering target. In other words, because sputtering involves a phenomenon in which positive argon ions with kinetic energy are made to strike the surface of the cathode sputtering target, causing a portion of the sputtering target which receives this energy to be sputtered from the target surface, the weaker the bonds between ions or the bonds between atoms of the materials which constitute the sputtering target, the higher the rate of sputtering caused by the ions striking the target.

On the other hand, looking now at solar cells in which the oxide based transparent conductive films are used, these solar cells comprise p-type and n-type semiconductors in a layered structure, and are broadly classified according to the type of semiconductor. The most commonly used type of solar cell uses silicon, which is both safe, and abundant in terms of natural resources. There are three types of solar cells using silicon, those using single cell silicon, polysilicon and amorphous silicon. Furthermore, development is proceeding in the field of solar cells known as compound thin film solar cells, which use compound semiconductors such as $CuInSe_2$, GaAs and CdTe and the like.

However, regardless of the type of solar cell, it is essential that an oxide based transparent conductive film is provided as an electrode on the side of the solar cell which is exposed to light, and conventionally, an ITO film, or a zinc oxide (ZnO) film doped with aluminum or gallium or the like, has been used. Properties required of these oxide based transparent conductive films are low resistance and high transmittance of sunlight.

As disclosed in Japanese Patent Application No. 2002-200534 by the inventors of the present invention, recently it became apparent, based on research carried out by the inventors, that crystalline oxide based transparent conductive films composed mainly of indium, and containing either tungsten, or tungsten and tin, are useful as the transparent electrodes for a solar cell. These oxide based transparent conductive films not only have low resistance and excellent light transmission capability for the visible light spectrum, but also have excellent light transmission capability for the infrared spectrum when compared to conventionally used ITO films and zinc oxide films, and therefore using such an oxide based transparent conductive film as the surface electrode of a solar cell also enables the effective use of infrared light energy.

Furthermore, as disclosed in Japanese Patent Application No. 2002-157568 by the inventors of the present invention, it became apparent that an amorphous oxide based transparent conductive film composed mainly of indium and containing tungsten is useful as a transparent electrode for display devices such as organic EL displays. Particularly when used as a transparent electrode for organic EL displays, because an extremely thin film of an organic compound is formed thereon, if the transparent electrode has a high degree of surface unevenness, then leak damage of the organic compound occurs. Because these amorphous oxide based transparent conductive films have both low resistance and excellent surface smoothness, they are useful as a transparent electrode for use in such cases when surface smoothness is required.

Furthermore, as disclosed in Japanese Patent Application No. 2002-211678 by the inventors of the present invention, it became apparent that a thin film layered product comprising an amorphous indium oxide film containing tungsten and a metallic conductive film layer has excellent surface smoothness and a sheet resistance of 1 to 5 $\Omega/\square$ even at film thicknesses between 100 and 150 nm, and also has excellent transparency, and is therefore useful in high definition or large scale LCDs or as a transparent electrode for organic EL displays. The indium oxide film containing tungsten in the thin film product with the above structure is an amorphous film formed by a sputtering method, which being formed on the surface of the metallic conductive film layer, protects the metallic conductive film layer.

The oxide based transparent conductive film composed mainly of indium and including either tungsten or tungsten and tin is manufactured using a DC sputtering method, which is widely used industrially, but in terms of productivity and cost reduction, it is necessary for deposition to be achieved quickly. However, because it was not possible to obtain a sputtering target which could be used to deposit these oxide based transparent conductive films, and which had a crystalline structure enabling the deposition rate of the sputtering method to be improved, it was impossible to perform deposition at fast speeds.

Furthermore, the manufacture of these oxide based transparent conductive films using an ion plating method is also being investigated.

SUMMARY OF THE INVENTION

In accordance with the above circumstances, an object of the present invention is to provide an oxide sintered body for use as a sputtering target or an ion plating tablet which is capable of depositing quickly an oxide based transparent conductive film which has low resistance and high transmittance for both the visible region and the infrared region, using a DC sputtering method.

An object of the present invention is to provide an oxide sintered body for use as a sputtering target or an ion plating tablet which enables the manufacture of an oxide based transparent conductive film with low resistance and excellent transmission characteristics for the infrared light region, and for which fast deposition is possible.

PREFERRED EMBODIMENTS OF THE INVENTION

An embodiment of the present invention is an oxide sintered body composed mainly of indium and containing tungsten, which has a resistivity of up to 1 k$\Omega$cm.

In addition, the resistivity is preferably up to 50 $\Omega$cm, more preferably up to 1 $\Omega$cm, more preferably up to $1\times10^{-2}$ $\Omega$cm or more preferably up to $1\times10^{-3}$ $\Omega$cm, and the tungsten content is preferably at a W/In atomic ratio of at least 0.001, and no more than 0.17. In addition, the oxide sintered body of the present invention preferably comprises mainly a bixbyite structure indium oxide crystal phase containing tungsten in a solid solution, and/or an indium tungstate compound crystal phase, and contains no tungsten oxide crystal phase.

Another embodiment of the oxide sintered body of the present invention is an oxide sintered body composed mainly of indium, and containing tungsten and tin, which has a resistivity of no more than 1 k$\Omega$cm.

In addition, the resistivity is preferably no more than 60 $\Omega$cm more preferably up to 1 $\Omega$m, more preferably up to $1\times10^{-2}$ $\Omega$cm or more preferably up to $1\times10^{-3}$ $\Omega$cm, and the tungsten content is preferably at a W/In atomic ratio of at least 0.001, and no more than 0.17, and the tin content is preferably at a Sn/In atomic ratio of at least 0.001, and no more than 0.15. In addition, the oxide sintered body of the present invention preferably mainly comprises a bixbyite structure indium oxide crystal phase containing tungsten and tin in a solid solution, and/or an indium tungstate compound crystal phase, and/or an indium stannate compound crystal phase, and does not contain an tungsten oxide crystal phase.

The inventors of the present invention prepared oxide sintered bodies composed mainly of indium and containing tungsten (indium oxide sintered bodies) under various manufacturing conditions, and performed sputtering deposition without heating the substrate, using the oxide sintered bodies as the sputtering target, and using the same gas pressure, type of deposition gas, distance between the target and the substrate, deposition DC power and film thickness for each, and then measured their characteristics. These experiments and tests showed that the deposition rate of the DC sputtering method depends on the resistivity of the oxide sintered body used as the sputtering target, and that in the case of an oxide sintered body composed mainly of indium and containing tungsten, fast deposition rates can be realized if the resistivity is up to 1 k$\Omega$cm, and preferably no more than $1\times10^{-2}$ $\Omega$cm.

Furthermore, the resistivity of the oxide sintered body can be lowered by subjecting the oxide sintered body to a reduction process by heating in a non-oxidative atmosphere such as nitrogen. However, the resistivity of an oxide sintered body composed mainly of indium and containing tungsten depends on the form of the tungsten, and specifically, when tungsten oxide is present in the oxide sintered body, it is difficult for the resistivity of the oxide sintered body to be lowered effectively by the reduction process.

Furthermore, the tests and experiments performed by the inventors of the present invention showed that of oxide sintered bodies which are composed mainly of indium and contain tungsten, the use of an oxide sintered body comprising a bixbyite structure indium oxide crystal phase containing tungsten as a solid solution, and/or an indium tungstate compound crystal phase, and having no tungsten oxide crystal phase present, allows a higher deposition rate under the same conditions than the case in which an oxide sintered body in which a tungsten oxide crystal phase can be detected is used, even if the resistivity is the same. This finding is assumed to be because the sputtering rate of a tungsten oxide crystal phase is slow.

A bixbyite structure is a type of indium oxide ($In_2O_3$) crystal structure, and is also called a C-rare earth oxide type structure ("Transparent Conductive film Technology", Ohm Co., 1999, p.82). In addition to the bixbyite structure, $In_2O_3$ can also take the form of a corundum structure. Positive ions such as tungsten and tin are substituted for the indium position of the bixbyite structure indium oxide to form a solid solution.

Furthermore, an example of the indium tungstate compound is the $InW_3O_9$ compound disclosed in JCPDS card 33-627, for example. Even if there are slight differences in composition from the stoichiometric composition, or the partial substitution of other ions occurs, provided that the crystal structure is maintained, it remains within the scope of this compound.

According to the experiments performed by the inventors of the present invention, the same tendencies described above were observed for an indium tungstate compound containing tin.

The form of tungsten in an oxide sintered body composed mainly of indium (an indium oxide sintered body) varies according to the size of the tungsten oxide particles in the raw material from which the oxide sintered body is made, and the reduction process performed on the sintered body. In other words, if the average particle size of the tungsten oxide particles in the raw material is up to 1 μm, then indium oxide tends not to be produced within the sintered body, and the resistivity of the sintered body is low. Furthermore, even if tungsten oxide is present in the sintered body, if the average particle size of the tungsten oxide particles in the raw material is within a range from 3 μm to 5 μm, then the resistivity of the sintered body is reduced to within acceptable levels by the reduction process.

As described above, it was apparent that an oxide based transparent conductive film deposited using an oxide sintered body containing tungsten as a sputtering target is useful as the transparent electrode for a solar cell, for the following reasons.

When manufacturing an oxide based transparent conductive film which is deposited using as the sputtering target an oxide sintered body obtained by including tungsten, the tungsten with a valency of between four and six occupies the indium position which has a valency of three as an ionized impurity, causing carrier electrons to be released, and conductance to increase. Generally, an increase in ionized impurities in an n-type semiconductor such as indium oxide results in an increase in the number of carrier electrons, but also results in a reduction in the mobility of the carrier electrons due to ionized impurity scattering. However, if tungsten is added to the indium oxide in the form of ionized impurities, the number of carrier electrons can be increased without greatly reducing their mobility. Accordingly, because the inclusion of tungsten allows the number of carrier electrons to be increased slightly with the mobility of the carrier electrons remaining high, an oxide based transparent conductive film which has low resistance and high infrared light transmittance can be realized. This is the main reason for including tungsten in the present invention.

In order to prepare an oxide based transparent conductive film with resistance low enough to be practical, the tungsten in the target is preferably at a W/In atomic ratio of between 0.001 and 0.17. If the W/In atomic ratio is less than 0.001, no effect can be perceived, and at greater than 0.17, the reduction in mobility due to impurity scattering is significant, causing the resistance to rise.

Furthermore, a different embodiment of the present invention contains both tin and tungsten. When an oxide based transparent conductive film is prepared using this type of oxide sintered body as the sputtering target, the indium position which has a valency of 3 is occupied by tin with a valency of 4 and tungsten with a valency between 4 and 6, causing carrier electrons to be released, and conductance to increase. The objects and effects of the inclusion of tungsten are the same as above. The reason for including tin is that the same effects as above can be obtained when the increase in carrier electrons is supplemented by adding tin in addition to tungsten, with the mobility of the carrier electrons remaining high.

In order to prepare an oxide based transparent conductive film with low resistance and excellent transmission characteristics for both the visible light spectrum and the infrared spectrum, the target or tablet preferably contains an amount of tungsten at a W/In atomic ratio between 0.001 and 0.17, and contains an amount of tin at a Sn/In atomic ratio between 0.001 and 0.15. If the amount of tin is less than 0.001, then adding tin has no effect, and if greater than 0.15, the reduction in mobility due to impurity scattering is significant, causing the resistance to rise.

Accordingly, by using a sputtering target or ion plating tablet prepared from an oxide sintered body of the present invention, a low resistance oxide based transparent conductive film with good light transmission capability in both the visible light region and the infrared light region, or a low resistance transparent conductive film with a smooth surface, can be manufactured by a sputtering method or an ion plating method more quickly than has been conventionally possible.

EXAMPLES

The present invention is described more specifically below using examples.

An Oxide Sintered Body Composed Mainly of Indium and Containing Tungsten

Examples 1 to 4

The Effect of Average Particle Diameter

Using $In_2O_3$ powder with an average particle diameter of up to 1 μm and $WO_3$ powder with an average particle diameter of up to 1 μm as the raw material powders, mixtures of $In_2O_3$ powder and $WO_3$ powder containing each component at predetermined ratios were prepared to provide the atomic ratios shown in Table 1. Each mixture was placed in a resin pot, and mixed in a wet ball mill. At this time, a hard $ZrO_2$ ball was used, and the mixing time was set to 18 hours. After mixing had completed, the resulting slurry was removed and filtered, dried and crushed.

The crushed substance was then molded by applying 294 MPa (3 ton/cm$^2$) of pressure in a cold isostatic press.

Next, the molded product was sintered in the following manner. Using an atmosphere in which oxygen is introduced into the air in the sintering furnace at a rate of 5 liters/minute per 0.1 m$^3$ of furnace capacity, sintering was performed for 3 hours at 1100° C. In this case, the temperature was raised at a rate of 1° C./minute, and during cooling after sintering, the introduction of oxygen was halted and cooling to 1000° C. was conducted at a rate of 10° C./minute.

On crushing the thus obtained coarse oxide sintered bodies and performing X-ray powder diffraction measurements, it was observed that a diffraction peak caused by the crystal phase of a bixbyite structure was present in the oxide sintered bodies of examples 1 to 4, and that a diffraction peak caused by a $InW_3O_9$ phase disclosed in JCPDS card 33-627 was also present in examples 2 to 4, but no diffraction peak caused by $WO_3$ or $WO_2$ was observed in any of the examples 1 to 4. Furthermore, it was apparent from EPMA analysis that tungsten was present in the indium oxide phase as a solid solution.

Each obtained oxide sintered body was processed to a diameter of 152 mm and a thickness of 5 mm, the sputtering surface was polished by a cup grindstone, and the resistivity of the sputtering surface of the oxide sintered body was measured using the four-point probe method.

The results are shown in Table 1. The resistivity of the oxide sintered bodies was between 0.5 kΩm and 1 kΩcm.

In addition, each processed oxide sintered body was bonded to a backing plate made of oxygen free copper using metallic indium, to produce a sputtering target.

Next, the sputtering target was attached to a non-magnetic target cathode in a DC magnetron sputtering system, and a glass substrate was provided in parallel to the target in a position opposing the target. The section of the glass substrate which faced the center of the sputtering target was marked with a marker pen. The distance between the target and the substrate was set to 60 mm, pure argon gas was mixed with 1% oxygen gas and introduced to obtain a gas pressure of 0.5 Pa, a DC plasma was generated at 160W DC, and with the substrate and the sputtering target remaining in static opposition and without heating the substrate, DC sputtering was performed for 30 minutes. Furthermore, in order to evaluate the resistivity and optical characteristics of the film, the substrate was heated to 300° C. and DC sputtering was performed for 5 minutes, without marking the substrate with a marker pen.

After deposition had completed, the mark left by the marker pen and the thin film which had accumulated thereon were removed by acetone, and the resulting difference in level, that is the film thickness, was measured using a surface roughness tester. The deposition rate was calculated by dividing the film thickness by the deposition time.

The deposition rates which were obtained are shown in Table 1.

TABLE 1

| | Atomic Ratio of W/In in Sintered Oxide | Resistivity of sintered oxide (Ωcm) | Deposition Rate (nm/min) |
|---|---|---|---|
| Example 1 | 0.001 | 0.9 k | 48 |
| Example 2 | 0.04 | 0.8 k | 50 |
| Example 3 | 0.10 | 0.7 k | 51 |
| Example 4 | 0.17 | 0.5 k | 53 |

In order to investigate the characteristics of the obtained thin films, thin films were prepared by performing film deposition for the deposition times calculated from the deposition rates as necessary to obtain film thicknesses of approximately 300 nm respectively, and the surface resistance was measured by the four-point probe method in order to calculate the resistivity. At the same time, the optical characteristics were measured using a spectrophotometer.

The results showed that the resistivity of the thin films was less than $1 \times 10^{-3}$ Ωcm, and the optical transmission was excellent for both the visible light region and the infrared light region.

Comparative Examples 1 to 4

The Effect of Average Particle Diameter

Oxide sintered bodies were prepared under the same conditions as the examples 1 through 4, with the exceptions that $WO_3$ powder with an average particle size of between 3 μm and 5 μm was used, that the powders were mixed at predetermined ratios to obtain the atomic ratios shown in Table 2, and that the mixing time in the wet ball mill was shorter, at 5 hours. In addition, the resistivity of the oxide sintered bodies was measured, the sputtering targets were prepared and DC sputtering was performed, thin films were deposited, and the deposition rates were calculated from the measured film thicknesses, in the same manner as for the examples 1 to 4.

The resistivity measured for the oxide sintered bodies, and the deposition rates which were obtained are shown in Table 2.

Analysis by X-ray powder diffraction measurement, a scanning electron microscope and EPMA showed that these oxide sintered bodies included a $WO_3$ phase. Furthermore, the resistivity of the oxide sintered bodies was between 11 kΩcm and 39 kΩcm.

TABLE 2

| | Atomic Ratio of W/In in Sintered Oxide | Resistivity of sintered oxide (Ωcm) | Deposition Rate (nm/min) |
|---|---|---|---|
| Com. Example 1 | 0.001 | 11 k | 38 |
| Com. Example 2 | 0.04 | 23 k | 37 |
| Com. Example 3 | 0.10 | 25 k | 37 |
| Com. Example 4 | 0.17 | 39 k | 34 |

Com. = Comparative

In order to investigate the characteristics of the obtained thin films, thin films were prepared by performing film deposition for the deposition times calculated from the deposition rates as necessary to obtain film thicknesses of approximately 300 nm respectively, and the surface resistance was measured by the four-point probe method in order to calculate the resistivity. At the same time, the optical characteristics were measured using a spectrophotometer.

As a result, the resistivity of the thin films of the comparative examples 1 to 4 was approximately 20 to 30% higher than that of the thin films obtained in the examples 1 to 4, although it was lower than $1 \times 10^{-3}$ Ωcm in each case, and transmission characteristics were good in both the visible light region and the infrared light region.

However, a comparison of the deposition rates in Table 1 and Table 2 shows that the deposition rates for the examples 1 to 4, which used sputtering targets prepared from oxide sintered bodies formed from a bixbyite structure indium oxide crystal phase and/or an indium tungstate compound crystal phase, were markedly higher than those for the comparative examples 1 to 4 which used sputtering targets prepared from oxide sintered bodies containing a tungsten oxide crystal phase, and these higher deposition rates are useful in terms of productivity.

Examples 5 to 20

The Effects of the Reduction Process

Next, the oxide sintered bodies composed of indium oxide and containing tungsten according to the examples 1 to 4, which comprise a bixbyite structure indium oxide crystal phase and an indium tungstate compound crystal phase, were subjected to heating and a reduction process (annealing) in a vacuum to control the resistivity. By setting the anneal temperature to 1100° C. and varying the annealing time within a range from 1 hour to 10 hours, oxide sintered bodies with a variety of resistivity values were obtained.

In other words, the oxide sintered body obtained according to the example 1 was used in examples 5, 9, 13 and 17, the oxide sintered body obtained according to the example 2 was used in examples 6, 10, 14 and 18, the oxide sintered body obtained according to the example 3 was used in examples 7, 11, 15 and 19, and the oxide sintered body obtained according to the example 4 was used in examples 8, 12, 16 and 20. The annealing time was set to 1 hour for the examples 5 to 8, 3 hours for the examples 9 to 12, 6 hours for the examples 13 to 16, and 10 hours for the examples 17 to 20.

X-ray powder diffraction measurement was used to verify that the crystal phases which constitute the oxide sintered bodies remained unchanged after annealing.

Subsequent to the reduction process (annealing), the oxide sintered bodies were processed to a diameter of 152 mm and a thickness of 5 mm, and the sputtering surfaces were polished using a cup grindstone. The resistivity of the sputtering surfaces of the oxide sintered bodies was measured using the four-point probe method.

The measured resistivity values are shown in Table 3.

In addition, after having undergone the reduction process (annealing), the oxide sintered bodies were processed through grinding using the same method as the examples 1 to 4, and bonded to a backing plate made of oxygen free copper, to produce sputtering targets. DC sputtering was performed using these sputtering targets under the same conditions as the examples 1 to 4, and the deposition rates were calculated from the measured film thickness values.

The deposition rates which were obtained are shown in Table 3.

TABLE 3

| | Atomic Ratio of W/In in Sintered Oxide | Resistivity of sintered oxide ($\Omega$cm) | Deposition Rate (nm/min) |
|---|---|---|---|
| Example 5 | 0.001 | 10 | 53 |
| Example 6 | 0.04 | 23 | 52 |
| Example 7 | 0.10 | 43 | 56 |
| Example 8 | 0.17 | 24 | 54 |
| Example 9 | 0.001 | $7 \times 10^{-1}$ | 58 |
| Example 10 | 0.04 | $4 \times 10^{-2}$ | 55 |
| Example 11 | 0.10 | $6 \times 10^{-1}$ | 59 |
| Example 12 | 0.17 | $9 \times 10^{-2}$ | 58 |
| Example 13 | 0.001 | $9 \times 10^{-3}$ | 64 |
| Example 14 | 0.04 | $6 \times 10^{-3}$ | 63 |
| Example 15 | 0.10 | $3 \times 10^{-3}$ | 62 |
| Example 16 | 0.17 | $8 \times 10^{-3}$ | 65 |
| Example 17 | 0.001 | $9 \times 10^{-4}$ | 65 |
| Example 18 | 0.04 | $6 \times 10^{-4}$ | 67 |
| Example 19 | 0.10 | $3 \times 10^{-4}$ | 65 |
| Example 20 | 0.17 | $5 \times 10^{-4}$ | 65 |

It is apparent from Table 3 that the lower the resistivity of the oxide sintered body, the more the deposition rate increases. When the resistivity of the oxide sintered body is less than $1 \times 10^{-2}$ $\Omega$cm (the examples 13 to 20), deposition can be achieved at higher speeds (faster than 62 nm/min).

In order to investigate the characteristics of the obtained thin films, thin films were prepared by performing film deposition for the deposition times calculated from the deposition rates as necessary to obtain film thicknesses of approximately 300 nm respectively, and the surface resistance was measured by the four-point probe method in order to calculate the resistivity. At the same time, the optical characteristics were measured using a spectrophotometer.

The results showed that the resistivity of the thin films was less than $1 \times 10^{-3}$ $\Omega$cm, and the optical transmission was good for both the visible light region and the infrared light region.

Examples 21 to 28

The Effects of the Reduction Process

Next, the oxide sintered bodies prepared in the comparative examples 1 to 4 were heated and subjected to a reduction process (annealing) in a vacuum, to control the resistivity. By setting the anneal temperature to 1100° C. and varying the annealing time within a range from 5 hours to 10 hours, oxide sintered bodies with a variety of resistivity values were obtained.

In other words, the oxide sintered body obtained according to the comparative example 1 was used in examples 21 and 25, the oxide sintered body obtained according to the comparative example 2 was used in examples 22 and 26, the oxide sintered body obtained according to the comparative example 3 was used in examples 23 and 27, and the oxide sintered body obtained according to the comparative example 4 was used in examples 24 and 28. The annealing time was set to 5 hours for the examples 21 through 24, and 10 hours for the examples 25 through 28.

X-ray powder diffraction measurement was used to verify that the crystal phases which constitute the oxide sintered bodies remained unchanged after annealing.

Subsequent to the reduction process (annealing), the oxide sintered bodies were processed to a diameter of 152 mm and a thickness of 5 mm, and the sputtering surfaces were processed through grinding by a cup grindstone. The resistivity of the sputtering surfaces of the oxide sintered bodies was measured using the four-point probe method.

The measured resistivity values are shown in Table 4.

In addition, after having undergone the reduction process (annealing), the oxide sintered bodies were processed through grinding using the same method as the examples 1 to 4, and bonded to a backing plate made of oxygen free copper to produce sputtering targets. DC sputtering was performed using these sputtering targets under the same conditions as the examples 1 to 4, and the deposition rates were calculated from the measured film thickness values.

The obtained deposition rates are shown in Table 4.

TABLE 4

| | Atomic Ratio of W/In in Sintered Oxide | Resistivity of sintered oxide ($\Omega$cm) | Deposition Rate (nm/min) |
|---|---|---|---|
| Example 21 | 0.001 | 0.4 k | 48 |
| Example 22 | 0.04 | 0.6 k | 47 |
| Example 23 | 0.10 | 0.5 k | 47 |
| Example 24 | 0.17 | 0.8 k | 47 |
| Example 25 | 0.001 | 20 | 50 |
| Example 26 | 0.04 | 17 | 52 |
| Example 27 | 0.10 | 25 | 50 |
| Example 28 | 0.17 | 44 | 49 |

In order to investigate the characteristics of the obtained thin films, thin films were prepared by performing film deposition for the deposition times calculated from the deposition rates as necessary to obtain film thicknesses of approximately 300 nm respectively, and the surface resistance was measured by the four-point probe method in order to calculate the resistivity. At the same time, the optical characteristics were measured using a spectrophotometer.

The results showed that the resistivity of the thin films was less than $1 \times 10^{-3}$ $\Omega$cm, and the optical transmission was good for both the visible light region and the infrared light region.

A comparison of the examples 5 to 8 which do not contain tungsten oxide and the examples 25 to 28 which do contain tungsten oxide showed that the resistivity of the oxide sintered bodies is at approximately the same level, but the deposition rates of the examples 5 to 8 were slightly faster. Accordingly, it is apparent that the deposition rate can be improved by using an oxide sintered body comprising a bixbyite structure indium oxide crystal phase which contains tungsten as a solid solution, and/or an indium tungstate compound crystal phase (the examples 5 to 8), which does not contain a tungsten oxide crystal phase, and this is desirable also in terms of productivity.

Furthermore, in oxide sintered bodies composed mainly of indium and containing tungsten, oxide sintered bodies which contain a tungsten oxide crystal phase could only lower the resistivity by several dozen Ωcm through the vacuum annealing process, as seen in the examples 25 to 28.

Accordingly, a low resistance oxide sintered body which enables fast deposition should be an oxide sintered body comprising a bixbyite structure indium oxide crystal phase which contains tungsten as a solid solution and/or an indium tungstate compound crystal phase, which does not contain a tungsten oxide crystal phase, as prepared in the examples 1 to 4.

Oxide Sintered Bodies Composed Mainly of Indium and Containing Tungsten and Tin

Examples 29 to 44

The Effects of Particle Diameter

Oxide sintered bodies were prepared under the same conditions as the examples 1 to 4, with the exception that mixtures were prepared using $In_2O_3$ powder, $WO_3$ powder and $SnO_2$ powder with average particle diameters of up to 1 μm as the raw materials, which were combined at predetermined ratios to obtain a fixed W/In atomic ratio of 0.10 and to obtain the Sn/In atomic ratios shown in Table 5. X-ray powder diffraction measurements, a scanning electron microscope and EPMA confirmed that these oxide sintered bodies did not include a tungsten oxide crystal phase, and that the oxide sintered bodies comprised a bixbyite structure indium oxide crystal phase containing tungsten and tin as a solid solution and/or an indium tungstate compound crystal phase and/or an indium stannate compound crystal phase.

Next, the obtained oxide sintered bodies were heated and subjected to a reduction process (annealing) in a vacuum to control the resistivity. By setting the anneal temperature to 1100° C. and varying the annealing time within a range from 1 hour to 10 hours, oxide sintered bodies with a variety of resistivity values were obtained.

In other words, oxide sintered bodies with the same atomic ratios was used in examples 29, 33, 37 and 41, oxide sintered bodies with the same atomic ratios was used in examples 30, 34, 38 and 42, oxide sintered bodies with the same atomic ratios was used in examples 31, 35, 39 and 43, and oxide sintered bodies with the same atomic ratios was used in examples 32, 36, 40 and 44. The annealing time was set to 1 hour for the examples 29 to 32, 3 hours for the examples 33 to 36, 6 hours for the examples 37 to 40, and 10 hours for the examples 41 to 44.

X-ray powder diffraction measurement was used to verify that the crystal phases which constitute the oxide sintered bodies remained unchanged after annealing.

Subsequent to the reduction process (annealing), the oxide sintered bodies were processed to a diameter of 152 mm and a thickness of 5 mm, and the sputtering surfaces were processed through grinding by a cup grindstone. The resistivity of the sputtering surfaces of the oxide sintered bodies was measured using the four-point probe method.

The measured resistivity values are shown in Table 5.

In addition, after having undergone the reduction process (annealing), the oxide sintered bodies were processed through grinding using the same method as the examples 1 to 4, and bonded to a backing plate made of oxygen free copper, to produce sputtering targets. DC sputtering was performed using these sputtering targets under the same conditions as the examples 1 to 4, and the deposition rates were calculated from the measured film thickness values.

The obtained deposition rates are shown in Table 5.

TABLE 5

| | Atomic Ratio of Sn/In in Sintered Oxide | Resistivity of sintered oxide (Ωcm) | Deposition Rate (nm/min) |
| --- | --- | --- | --- |
| Example 29 | 0.01 | 55 | 52 |
| Example 30 | 0.05 | 56 | 53 |
| Example 31 | 0.10 | 50 | 52 |
| Example 32 | 0.15 | 48 | 53 |
| Example 33 | 0.01 | $2 \times 10^{-1}$ | 53 |
| Example 34 | 0.05 | $1 \times 10^{-2}$ | 54 |
| Example 35 | 0.10 | $2 \times 10^{-1}$ | 53 |
| Example 36 | 0.15 | $4 \times 10^{-2}$ | 53 |
| Example 37 | 0.01 | $5 \times 10^{-3}$ | 64 |
| Example 38 | 0.05 | $5 \times 10^{-3}$ | 64 |
| Example 39 | 0.10 | $4 \times 10^{-3}$ | 65 |
| Example 40 | 0.15 | $5 \times 10^{-3}$ | 64 |
| Example 41 | 0.01 | $6 \times 10^{-4}$ | 68 |
| Example 42 | 0.05 | $4 \times 10^{-4}$ | 68 |
| Example 43 | 0.10 | $3 \times 10^{-4}$ | 67 |
| Example 44 | 0.15 | $5 \times 10^{-4}$ | 67 |

In order to investigate the characteristics of the obtained thin films, thin films were prepared by performing film deposition for the deposition times calculated from the deposition rates as necessary to obtain film thicknesses of approximately 300 nm respectively, and the surface resistance was measured by the four-point probe method in order to calculate the resistivity. At the same time, the optical characteristics were measured using a spectrophotometer.

The results showed that the resistivity of the thin films was less than $1 \times 10^{-3}$ Ωcm, and the optical transmission was good for both the visible light region and the infrared light region.

Comparative Examples 5 to 8

The Effect of Particle Diameter

Oxide sintered bodies were prepared under the same conditions as the examples 1 to 4, with the exceptions that mixtures were prepared using $In_2O_3$ powder and $SnO_2$ powder with average particle diameters of up to 1 μm, and $WO_3$ powder with an average particle diameter between 3 μm and 5 μm, which were combined at predetermined ratios to obtain a fixed W/In atomic ratio of 0.10 and the Sn/In atomic ratios shown in Table 6, and that the mixing time in the wet ball mill was shorter, at 5 hours. Analysis by X-ray powder diffraction measurement, a scanning electron microscope and EPMA showed that these oxide sintered bodies included a $WO_3$ phase.

The obtained oxide sintered bodies were processed to a diameter of 152 mm and a thickness of 5 mm, the sputtering surfaces were processed through grinding using a cup grindstone, and the resistivity of the sputtering surfaces of the oxide sintered bodies was measured using the four-point probe method.

The measurement results are shown in Table 6. The resistivity of the oxide sintered bodies was between 15 kΩm and 58 kΩcm.

The obtained oxide sintered bodies were then polished using the same method as the examples 1 to 4, and bonded to a backing plate made of oxygen free copper, to produce sputtering targets. DC sputtering was performed using these sputtering targets under the same conditions as the examples 1 to 4, and the deposition rates were calculated from the measured film thickness values.

The deposition rates which were obtained are shown in Table 6.

TABLE 6

| | Atomic Ratio of Sn/In in Sintered Oxide | Resistivity of sintered oxide ($\Omega$cm) | Deposition Rate (nm/min) |
|---|---|---|---|
| Com. Example 5 | 0.01 | 58 k | 34 |
| Com. Example 6 | 0.05 | 23 k | 35 |
| Com. Example 7 | 0.10 | 15 k | 34 |
| Com. Example 8 | 0.15 | 60 k | 32 |

Com. = Comparative

The deposition rates achieved when the oxide sintered bodies according to the comparative examples 5 through 8 were used as the sputtering target were between 32 and 35 nm/min, which is extremely slow in comparison with the examples 29 to 44, and impractical in terms of productivity.

Examples 45 to 52

The Effects of the Reduction Process

Next, the oxide sintered bodies prepared in the comparative examples 5 to 8 were heated and subjected to a reduction process (annealing) in a vacuum, to control the resistivity. By setting the anneal temperature to 1100° C. and varying the annealing time within a range from 5 hours to 10 hours, oxide sintered bodies with a variety of resistivity values were obtained.

In other words, the oxide sintered body obtained according to the comparative example 5 was used in examples 45 and 49, the oxide sintered body obtained according to the comparative Example 6 was used in examples 46 and 50, the oxide sintered body obtained according to the comparative example 7 was used in examples 47 and 51, and the oxide sintered body obtained according to the comparative example 8 was used in examples 48 and 52. The annealing time was set to 5 hours for the examples 45 through 48, and 10 hours for the examples 49 through 52.

X-ray powder diffraction measurement was used to verify that the crystal phases which constitute the oxide sintered bodies remained unchanged after annealing.

Subsequent to the reduction process (annealing), the oxide sintered bodies were processed to a diameter of 152 mm and a thickness of 5 mm, and the sputtering surfaces were processed through grinding by a cup grindstone. The resistivity of the sputtering surfaces of the oxide sintered bodies was measured using the four-point probe method.

The measured resistivity values are shown in Table 7.

In addition, after having undergone the reduction process (annealing), the oxide sintered bodies were processed through grinding using the same method as the examples 1 to 4, and bonded to a backing plate made of oxygen free copper, to produce sputtering targets. DC sputtering was performed using these sputtering targets under the same conditions as the examples 1 to 4, and the deposition rates were calculated from the measured film thickness values.

The thus obtained deposition rates are shown in Table 7.

TABLE 7

| | Atomic Ratio of Sn/In in Sintered Oxide | Resistivity of sintered oxide ($\Omega$cm) | Deposition Rate (nm/min) |
|---|---|---|---|
| Example 45 | 0.01 | 0.4 k | 48 |
| Example 46 | 0.05 | 0.6 k | 50 |
| Example 47 | 0.10 | 0.5 k | 47 |
| Example 48 | 0.15 | 0.8 k | 47 |
| Example 49 | 0.01 | 58 | 56 |
| Example 50 | 0.05 | 55 | 58 |
| Example 51 | 0.10 | 54 | 57 |
| Example 52 | 0.15 | 50 | 55 |

In order to investigate the characteristics of the obtained thin films, thin films were prepared by performing film deposition for the deposition times calculated from the deposition rates as necessary to obtain film thicknesses of approximately 300 nm respectively, and the surface resistance was measured by the four-point probe method in order to calculate the resistivity. At the same time, the optical characteristics were measured using a spectrophotometer.

The results showed that the resistivity of the thin films was less than $1 \times 10^{-3}$ $\Omega$cm, and the optical transmission was good for both the visible light region and the infrared light region.

Although the oxide sintered bodies according to the examples 45 to 52 contained a tungsten oxide crystal phase, subjecting these oxide sintered bodies to an annealing process in a vacuum reduced the resistivity to less than 1 k$\Omega$cm. Because the deposition rates were faster for these examples than for the oxide sintered bodies according to the comparative examples 5 to 8, this type of oxide sintered body can be used in production.

A comparison of the examples 29 to 32 and the examples 49 to 52 showed only that the resistivity of the oxide sintered bodies was at approximately the same level, and that the deposition rate was slightly higher for the examples 49 to 52. Accordingly, it is apparent that the oxide sintered bodies comprising a bixbyite structure indium oxide crystal phase containing tungsten as a solid solution and/or an indium tungstate compound crystal phase, which do not contain a tungsten oxide crystal phase (the examples 29 to 32) are preferable.

In addition, the exact same tendency was observed when the W/In atomic ratio of the sintered bodies was altered to 0.001, 0.01, 0.03, 0.07 or 0.15 and the Sn/In atomic ratio was varied in the same manner as in Table 6 and Table 7.

In the experiments relating to deposition in the present specification, deposition rates were compared based on sputtering deposition performed with an introduced DC power of 160 W, but same tendencies were observed when the introduced DC power was increased to 300 W and 500 W. Furthermore, the exact same tendencies were observed when deposition was performed using an RF sputtering method.

In addition it was confirmed that an oxide based transparent conductive film with the same characteristics as the examples could also be obtained when deposition was performed using an ion plating method.

By using an oxide sintered body of the present invention as a sputtering target or an ion plating tablet, because the oxide sintered body comprises a bixbyite structure indium oxide crystal phase containing tungsten as a solid solution and/or an indium tungstate compound crystal phase, and does not contain a tungsten oxide crystal phase, a sputtering target or an ion plating tablet can be provided which enables deposition to be achieved faster than with conventional targets, and enables the manufacture of a low resistance oxide based transparent conductive film. As a result, it is possible to manufacture quickly low resistance oxide based transparent conductive films with excellent transmission characteristics for both the visible light region and the infrared light region, and low resistance oxide based transparent conductive films with smooth surfaces, using industrially applicable sputtering methods or ion plating methods, and consequently highly efficient solar cells and organic EL displays and LCDs with excellent performance can be produced at low cost, and the industrial value of the present invention is readily apparent.

What is claimed is:

1. An oxide sintered body composed mainly of indium and containing tungsten, wherein the oxide sintered body comprises mainly a bixbyte structure indium oxide crystal phase containing tungsten in a solid solution and/or an indium tungstate compound crystal phase and wherein no tungsten oxide crystal phase is contained and having a resistivity of up to 1 k$\Omega$cm.

2. An oxide sintered body of claim 1, wherein the resistivity is up to 50 $\Omega$cm.

3. An oxide sintered body of claim 1, wherein the resistivity is up to 1 $\Omega$cm.

4. An oxide sintered body of claim 1, wherein the resistivity is up to $1\times10^{-2}$ $\Omega$cm.

5. An oxide sintered body of claim 1, wherein the resistivity is up $1\times10^{-3}$ $\Omega$cm.

6. An oxide sintered body of claim 1, wherein the tungsten is contained by an amount from 0.001 to 0.17 in W/In of atomic ratio.

7. An oxide sintered body composed mainly of indium and containing tungsten and tin, wherein the oxide sintered body comprises mainly a bixbyte structure indium oxide crystal phase containing tungsten and tin in a solid solution and/or an indium tungstate compound crystal phase and/or an indium stannate compound crystal phase and wherein no tungsten oxide crystal phase is contained and having a resistivity of up to 1 k$\Omega$cm.

8. An oxide sintered body of claim 7, wherein the resistivity is up to 60 $\Omega$cm.

9. An oxide sintered body of claim 7, wherein the resistivity is up to 1 $\Omega$cm.

10. An oxide sintered body of claim 7, wherein the resistivity is up to $1\times10^{-2}$ $\Omega$cm.

11. An oxide sintered body of claim 7, wherein the resistivity is up to $1\times10^{-3}$ $\Omega$cm.

12. An oxide sintered body of claim 7, wherein the tungsten is contained by an amount from 0.001 to 0.17 in W/In of atomic ratio, and wherein the tin is contained by an amount from 0.001 to 0.15 in Sn/In of atomic ratio.

* * * * *